United States Patent
Agrawal et al.

(10) Patent No.: US 12,287,941 B2
(45) Date of Patent: Apr. 29, 2025

(54) MANAGE OVERLAP OF ACTIONABLE USER INTERFACES AND SYSTEM NOTIFICATIONS

(71) Applicant: MOTOROLA MOBILITY LLC, Wilmington, DE (US)

(72) Inventors: Amit Kumar Agrawal, Bangalore (IN); Lakshmana Hanuman Mahath Somina, Bangalore (IN); Priya Krishnamurthy, Mysuru (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/185,926

(22) Filed: Mar. 17, 2023

(65) Prior Publication Data
US 2024/0310958 A1    Sep. 19, 2024

(51) Int. Cl.
*G06F 3/04886* (2022.01)
*G06F 3/041* (2006.01)

(52) U.S. Cl.
CPC ...... *G06F 3/04186* (2019.05); *G06F 3/04886* (2013.01)

(58) Field of Classification Search
CPC .......................... G06F 3/04186; G06F 3/04886
See application file for complete search history.

(56) References Cited

U.S. PATENT DOCUMENTS

| | | | | |
|---|---|---|---|---|
| 7,168,048 B1 * | 1/2007 | Goossen | ............... | G09G 5/42 715/796 |
| 8,209,628 B1 * | 6/2012 | Davidson | ............. | G06F 3/04842 715/800 |
| 8,397,179 B2 * | 3/2013 | Takagi | ................. | G09G 5/14 715/866 |
| 8,645,863 B2 * | 2/2014 | Mandic | ................ | G06F 40/166 715/810 |
| 8,893,038 B2 * | 11/2014 | Bennah | ................ | G06F 3/0481 715/779 |
| 8,997,017 B2 * | 3/2015 | Stecher | ................. | G06F 3/14 715/767 |
| 11,550,445 B1 * | 1/2023 | Steinberg | ............. | G06F 21/31 |
| 2004/0255254 A1 * | 12/2004 | Weingart | ............. | G06F 3/0483 715/793 |
| 2004/0261039 A1 * | 12/2004 | Pagan | .................... | G06F 9/451 715/790 |

(Continued)

*Primary Examiner* — Jeff Piziali
(74) *Attorney, Agent, or Firm* — Isidore PLLC

(57) ABSTRACT

An electronic device, method, and computer program product prevent inadvertent touch activation of a partially overlapped user interface (UI) element. The electronic device assigns, to a first image layer, a first UI including first UI element(s) that triggers a first response by program code when selected. The electronic device assigns, to a second image layer, a second UI including second UI element(s) that triggers a second response by the program code when selected. In response to determining that the first UI element(s) is displayed and selectable proximate to the second UI elements, the electronic device renders a display output including the first image layer and the second image layer utilizing a rendering scheme that prevents inadvertent selection of the first user interface element(s) during selection of the second user interface element(s). The electronic device presents the display output on the touch screen display.

20 Claims, 7 Drawing Sheets

(56) References Cited

U.S. PATENT DOCUMENTS

2005/0125741 A1\* 6/2005 Clow ................. G06F 9/451
 715/767
2014/0317568 A1\* 10/2014 Mizunuma .......... G06F 3/04886
 715/813

\* cited by examiner

MANAGE OVERLAP OF ACTIONABLE
USER INTERFACES AND SYSTEM
NOTIFICATIONS

BACKGROUND

1. Technical Field

The present disclosure relates generally to communication devices that have a touch screen display, and in particular to communication devices that can concurrently present overlapping selectable content on the touch screen display.

2. Description of the Related Art

User communication devices may be sized for mobility, enabling users to engage in audio as well as video communication sessions in nearly any location. Within a small handheld form factor, communication devices present sensors and output devices that can be used as a traditional phone handset with a speaker positioned to be used as an earpiece and a microphone positioned to capture audio inputs as spoken by a user. Some communication devices such as smartphones have become multi-functional devices as the designs have increasingly incorporated a large number of capabilities. In an example, rather than being limited to manually actuated control keys and buttons, touch screen displays are configurable to present visual content and graphical controls in support of many types of applications in addition to supporting user communication sessions.

Conventionally, communication devices with touch screens support executing program code for system utilities and system functions, which can present their own user interface (UI) in addition to the UIs of executing applications. These system utilities and functions often surface their UIs on top of an existing application user interface being presented on the touch screen display. For example, notifications and pop-up advertisement UI can overlap and/or be concurrently displayed with an existing application UI. With this layering (or overlaying) of UIs, actional UI elements of one UI presented on an upper/foreground layer of a display output may overlap or be positioned closely to actionable UI elements of a different UI presented on a background layer of the display output. Inadvertent selection of an actionable UI element in the background application UI occurs, given the size of a person's finger or possible imprecise pointing of the finger or a stylus.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
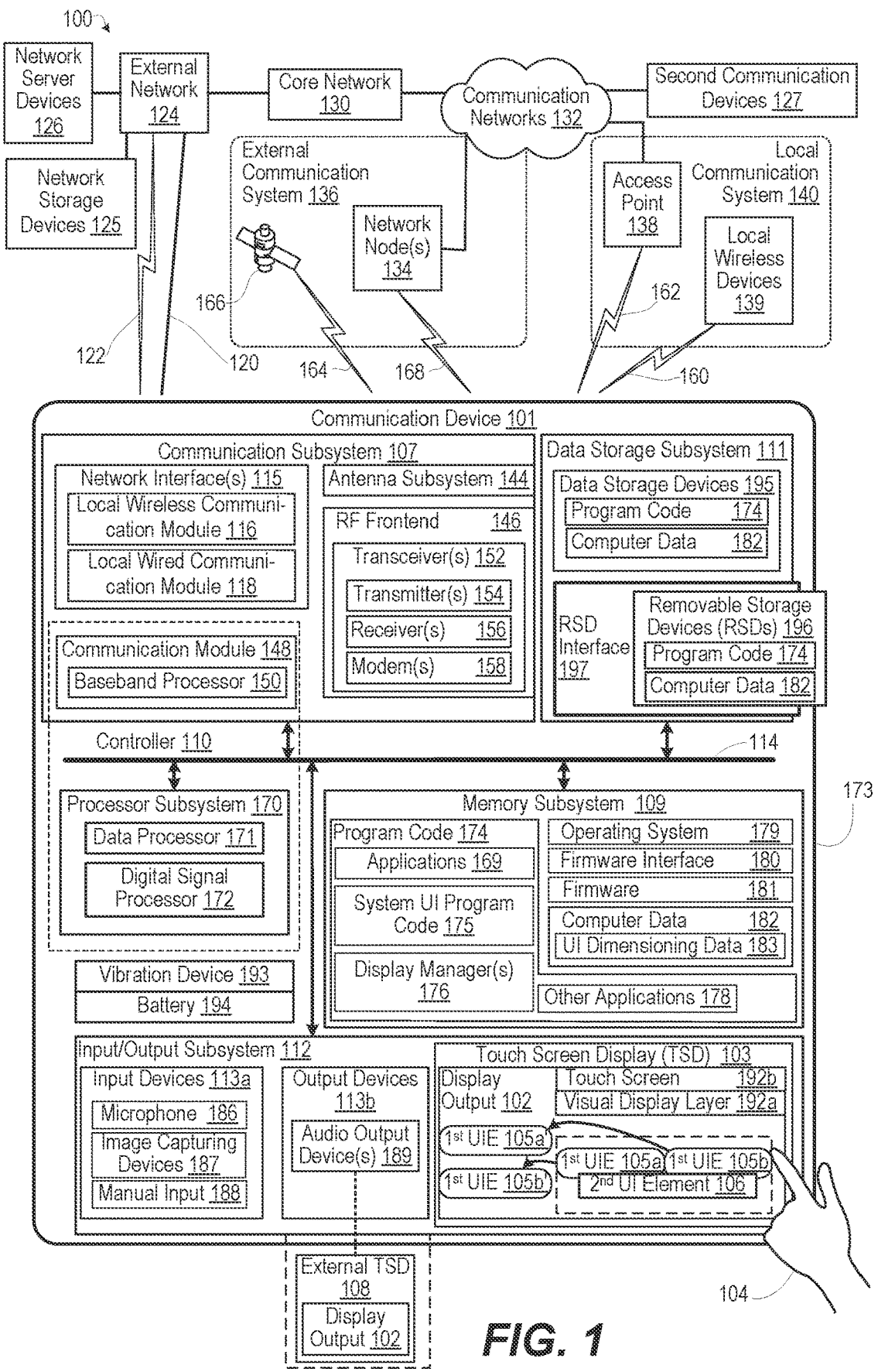
FIG. 1 depicts a functional block diagram of a communication environment including a communication device that supports rendering a display output on a touch screen display that prevents inadvertent selection of a user interface element, according to one or more embodiments.

According to aspects of the present disclosure, an electronic device, a method and a computer program product prevent inadvertent touch activation of a first user interface element in a background layer of a display output that is proximate to a second user interface element in a foreground layer of the display output. The electronic device includes a touch screen display having a visual display layer and a touch screen. The electronic device includes a memory storing program code that generates at least a first user interface when executed. A controller of the electronic device is communicatively connected to the touch screen display and the memory. The controller assigns, to a first image layer, the first user interface including at least one first user interface element that triggers a first response when selected. The controller assigns, to a second image layer, a second user interface comprising at least one second user interface element that triggers a second response when selected. The controller determines whether the at least one first user interface element is displayed and selectable proximate to the at least one second user interface element. The controller renders the display output including the first image layer and the second image layer utilizing a rendering scheme that prevents inadvertent selection of the at least one first user interface element during selection of the at least one second user interface element. The controller presents the display output on the touch screen display. In one or more embodiments, the rendering scheme enables the touch interface input controller to ignore selection of the at least one user interface element within an area proscribed around the at least one second user interface element that is enabled for selection. In one or more embodiments, the rendering scheme repositions the at least one first user interface element out of the area proscribed around the at least one second user interface element. In one or more embodiments, the rendering scheme repositions the at least one second user interface element out of an area proscribed around the at least one first user interface element.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of a communication environment 100 that includes an electronic device, which is referenced herein as communication device 101 and in which the features of the present disclosure are advantageously implemented. In particular, communication device 101 supports rendering display output 102 on touch screen display 103b that prevents inadvertent selection by user 104 of a control element, such as first user interface elements (UIEs) 105a and 105b, present in a background/underlying UI when attempting to select another control, such as second UIE 106, present in a foreground/overlaying UI. Communication device 101 includes communication subsystem 107 that enables communication device 101 to connect to external touch screen display 108 that may present display output 102 for selection by user 104. Aspects of the present disclosure described herein for rendering schemes that prevent inadvertent selection may be customized for display characteristics of more than one display such as touch screen display 103 and external touch screen display 108.

Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communications subsystem 107, communication device 101 includes memory subsystem 109, controller 110, data storage subsystem 111, and input/output (I/O) subsystem 112 having input devices 113a and output devices 113b. To enable management by controller 110, system interlink 114 communicatively connects controller 110 with communications subsystem 107, memory subsystem 109, data storage subsystem 111, and input/output subsystem 112. System interlink 114 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 114) are illustrated in FIG. 1, it is to be understood that more, fewer, or different interconnections may be present in other embodiments.

In one or more embodiments, communications subsystem 107 may include one or more network interfaces 115, such as local wireless communication module 116 and local wired communication module 118, to communicatively couple communication device 101 via network cable 120 or wireless connection 122 to external networks 124. Communication device 101, via external networks 124, may connect to network storage devices 125 that store computer data and to network server devices 126 that facilitate access to network storage device 125. Network server devices 126 may have identical or similar components and functionality as described above for communication device 101. Communication device 101 may communicate with second communication devices 127 via external network 124 or via communication networks 132 that are supported by core networks 130. Network interface(s) 115 may include a network interface controller (NIC) and support one or more network communication protocols. External network 124 can be a local area network (LAN), a campus area network (CAN), a metropolitan area network (MAN), or a wide area network (WAN). For example, network cable 120 and wireless connection 122 can be an Ethernet connection/cable.

In one or more embodiments, communications subsystem 107 may include additional functionality for communicating, using a cellular connection, with network node(s) 134 of external communication system 136 and for communicating, using a wireless connection, with wireless access point 138 or local wireless devices 139 of local communication system 140.

Communications subsystem 107 includes antenna subsystem 144. Communications subsystem 107 includes radio frequency (RF) front end 146 and communication module 148 having baseband processor 150. RF front end 146 includes transceiver(s) 152, which includes transmitter(s) 154 and receiver(s) 156. RF front end 146 further includes modem(s) 158. Baseband processor 150 of communication module 148 communicates with controller 110 and RF front end 146. Baseband processor 150 operates in a baseband frequency range to encode data for transmission and decode received data, according to a communication protocol. Modem(s) 158 modulates baseband encoded data from communication module 148 onto a carrier signal to provide a transmit signal that is amplified by transmitter(s) 154. Modem(s) 158 demodulates each signal received using antenna subsystem 144 from external communication system 136 or local communication system 140. The received signal is amplified and filtered by receiver(s) 156, which demodulates received encoded data from a received carrier signal.

In one or more embodiments, controller 110, via communications subsystem 107, performs multiple types of cellular over-the-air (OTA) or wireless communication with local communication system 140. Communications subsystem 107 can communicate via an OTA connection 160 with local wireless devices 139. In an example, OTA connection 160 is a Bluetooth connection, or other personal access network (PAN) connection. In one or more embodiments, communications subsystem 107 communicates with one or more locally networked devices via a wireless local area network (WLAN) link 162 supported by access point 138. In one or more embodiments, access point 138 supports communication using one or more IEEE 802.11 WLAN protocols. Access point 138 is connected to communication networks 132 via a cellular or wired connection. In one or more embodiments, communications subsystem 107 receives downlink channels 164 from GPS satellites 166 to obtain geospatial location information. Communications subsystem 107 can communicate via an over-the-air (OTA) cellular connection 168 with network node(s) 134.

Controller 110 includes processor subsystem 170, which includes one or more central processing units (CPUs), depicted as data processor 171. Processor subsystem 170 can include one or more digital signal processors 172 that can be integrated with data processor 171. Processor subsystem 170 can include other processors that are communicatively coupled to data processor 171, such as baseband processors 150 of communication module 148. In one or more embodiments that are not depicted, controller 110 can further include distributed processing and control components that are external to housing 173 or grouped with other components, such as I/O subsystem 112. Data processor 171 is communicatively coupled, via system interlink 114, to memory subsystem 109. In one or more embodiments, data processor 171 is communicatively coupled via system interlink 114 to communications subsystem 107, data storage subsystem 111 and I/O subsystem 112. Controller 110 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hardwired logic.

Memory subsystem 109 stores program code 174 for execution by processor subsystem 170 to provide the functionality described herein. Program code 174 includes code for applications such as applications 169 that generate first UIEs 105a and 105b, system UI program code 175 that generates second UIE 106, display manager(s) 176 that present display output 102 on touch screen display 103 and external touch screen display 108, and code for other applications 178, such as an advertising application and notification application, which generate pop-up windows that present UIs with selectable elements/content. External touch screen display 108 may be provided by a second electronic or communication device such as a laptop computer or computer workstation. In one or more embodiments, several of the described aspects of the present disclosure are provided via executable program code of applications executed by controller 110. In one or more embodiments, program code 174 may be integrated into a distinct chipset or hardware module as firmware that operates separately from executable program code. Portions of program code 174 may be incorporated into different hardware components that operate in a distributed or collaborative manner. Implementation of program code 174 may use any known mechanism or process for doing so using integrated hardware and/or software, as known by those skilled in the art. Memory subsystem 109 further includes operating system (OS) 179, firmware interface 180, such as basic input/output system (BIOS) or Uniform Extensible Firmware Interface (UEFI), and firmware 181.

Memory subsystem 109 includes computer data 182 such as UI dimensioning data 183 used by system UI program code 175 to render display output 102. Computer data 182 may incorporate "data" that originated as raw, real-world "analog" information that consists of basic facts and figures. Computer data 182 includes different forms of data, such as numerical data, images, coding, notes, and financial data. The computer data may originate at communication device 101 or be retrieved by communication device 101. Communication device 101 may store, modify, present, or transmit computer data 182. Computer data may be organized in one of a number of different data structures. Common examples of computer data 182 include video, graphics, text, and images as discussed herein. Computer data 182 can also be in other forms of flat files, databases, and other data structures.

I/O subsystem 112 includes input devices 113a and output devices 113b. Input devices 113a may include microphone 186, image capturing devices 187, and manual input devices 188 (e.g., keys and buttons). Output devices 113b may include audio output devices 189 in addition to touch screen display 103 and external touch screen display 108. I/O subsystem 112 may include haptic or tactile output devices such as vibration device 193 that oscillates a mass such as battery 194 to create vibratory alerts. Touch screen display 103 provides a user interface that presents display output 102 and receives user inputs. In particular, touch screen display 103 includes visual display layer 192a that presents display output 102. Visual display layer 192a is an example of output device 113b. Touch screen display 103 includes touch screen 192b above visual display layer 192a. Touch screen 192b is an example of input device 113a that receives selection of active elements such as second UIE 106. In one or more embodiments, other input devices 113a such as a mouse or joystick may provide the selection as an alternative to, or in addition to, touch screen 192b of touch screen display 103 or external touch screen display 108.

Data storage subsystem 111 of communication device 101 includes data storage device(s) 195. Controller 110 is communicatively connected, via system interlink 114, to data storage device(s) 195. Data storage subsystem 111 provides program code 174 and computer data 182 stored on non-volatile storage that is accessible by controller 110. For example, data storage subsystem 111 can provide a selection program code 174, such as applications 169, system UI program code 175, display manager(s) 176, and other applications 178. These applications can be loaded into memory subsystem 109 for execution/processing by controller 110. In one or more embodiments, data storage device(s) 195 can include hard disk drives (HDDs), optical disk drives, and/or solid-state drives (SSDs), etc. Data storage subsystem 111 of communication device 101 can include removable storage device(s) (RSD(s)) 196, which is received in RSD interface 197. Controller 110 is communicatively connected to RSD 196, via system interlink 114 and RSD interface 197. In one or more embodiments, RSD 196 is a non-transitory computer program product or computer readable storage device. Controller 110 can access data storage device(s) 195 or RSD 196 to provision communication device 101 with program code 174 and with computer data 182.

According to aspects of the present disclosure, controller 110 renders display output 102 utilizing a rendering scheme that prevents inadvertent selection of one of first UIEs 105a and 105b during selection of second UIE 106. First UIEs 105a and 105b are visible and otherwise would trigger a first response by/from the corresponding program code 174, such as applications 169. Second UIE 106 is displayed and can, in some embodiments, be selectable proximate to first UIEs 105a and 105b with a touch-free zone or buffer provided around second UIE 106 to prevent the inadvertent selection of first UIEs 105a-105B. Selection of second UIE 106 triggers a second response by corresponding program code 174, such as applications 169 or operating system 179. In one or more embodiments, controller 110 executes system UI program code 175 to proscribe area 198 around second UIE 106. Controller 110 may scale area 198 proscribed around second UIE 106 in relation to a display size provided by UI dimension data 183 about touch screen display 103 to correspond to an expected user touch accuracy. While being enabled to respond to selection of second UIE 106, controller 110 ignores selection of first UIEs 105a and 105b within area 198. In one or more alternate embodiments, controller 110 repositions first UIEs 105a and 105b outside of area 198 as first UIEs 105a' and 105b'. In yet another one or more alternate embodiments, controller 110 repositions second UIEs 106 outside of area 198 as second UIE 106.

Figure 2:
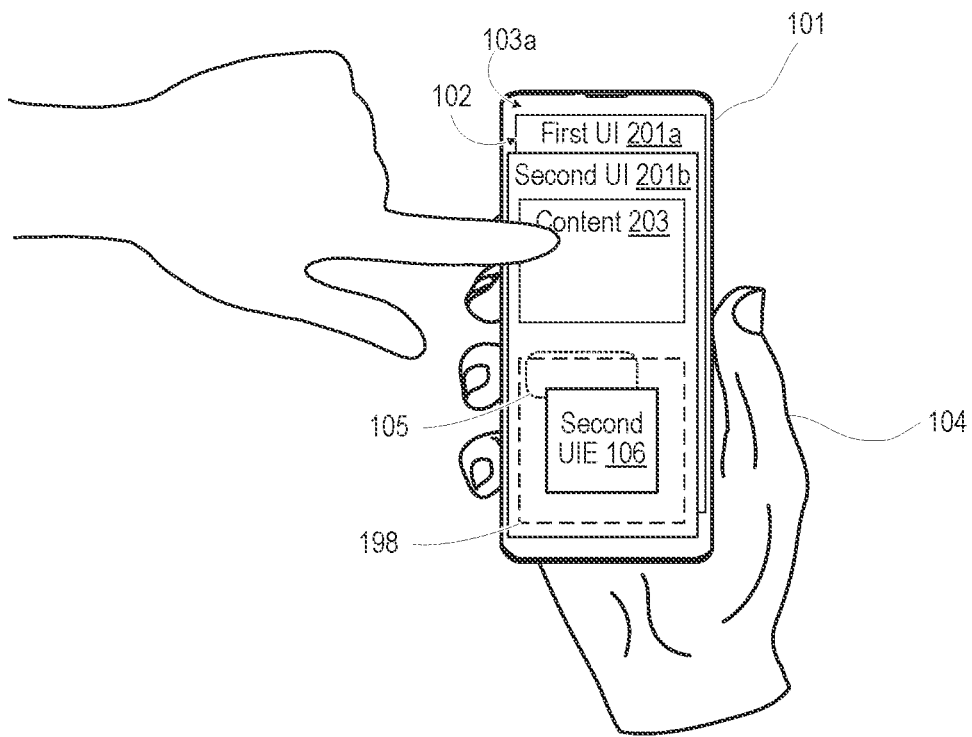
FIG. 2 is a front view of an example communication device having a small touch screen display presenting layered user interfaces with a first rendering scheme of an area proscribed around a second user interface element in a foreground layer to prevent inadvertent selection of a first user interface element in a background layer, according to one or more embodiments.

FIG. 2 is a front view of communication device 101 having touch screen display 103a that is presenting first and second user interfaces 201a and 201b. In rendering display output 102, controller 110 assigns first user interface 201a to a first image layer as a background/underlying layer. Controller 110 assigns second user interface 201b to a second image layer as a front/overlaying layer that is on top of the background layer. In addition to first UIE, first user interface 201a includes other items, such as content 203. In one or more embodiments, space between content 203 and second UIE 106 is transparent, enabling viewing and selection of first UIE 105 of the second image layer that is assigned to first user interface 201a. In another example, second user interface 201b does not extend beyond second UIE 106, exposing uncovered portions of first user interface 201a including first UIE 105. In rendering display output 102 to prevent inadvertent selection of first UIE 105, controller 110 is configured/programmed to enable selection of second UIE 106 while ignoring selection of first UIE 105 within area 198 while second UIE 105 is being presented within area 198. In one or more embodiments, controller 110 may change an image characteristic (e.g., by blurring or shading) of first UIE 105 within area 198 indicating that first UIE 105 is not selectable.

Figure 3A:
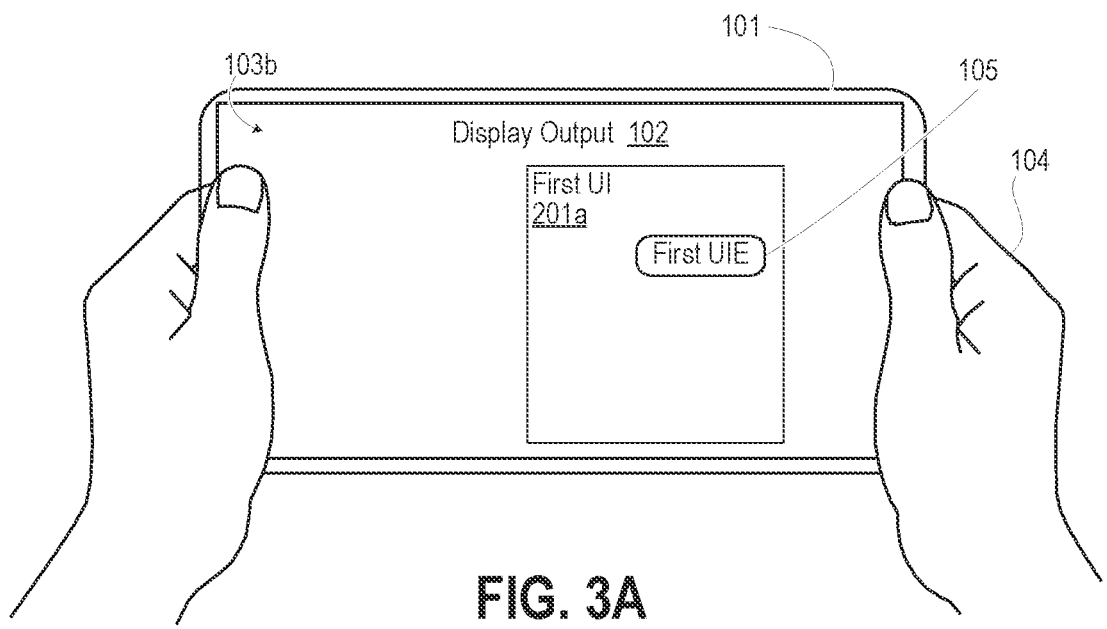
FIG. 3A is a front view of another example communication device having a touch screen display presenting a first user interface on a first image layer of a display output, according to one or more embodiments.
Figure 3B:
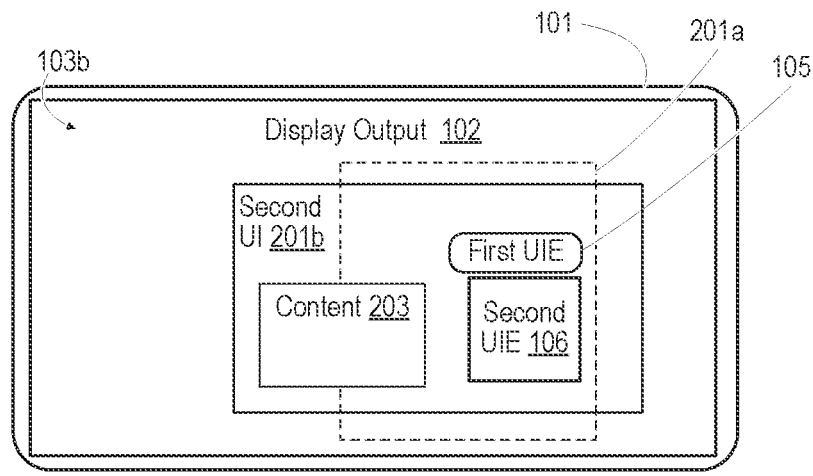
FIG. 3B is a front view of the communication device of FIG. 3A having the touch screen display presenting a second user interface on a second image layer that is layered on top of the first image layer of the display output, placing a second user interface element in the first image layer (i.e., foreground layer) with proximity to a first user interface element that is exposed through a transparent portion of the second image layer (i.e., a background layer), according to one or more embodiments.

FIG. 3A is a front view of communication device 101 having touch screen display 103b presenting first user interface 201a on a first image layer that is initially a topmost foreground layer of the display output. FIG. 3B is a front view of communication device of FIG. 3A having touch screen display 103b presenting second user interface 201b assigned as a second image layer that is layered on top of the first image layer, placing the first user interface 201a in a background layer and the second user interface 201b in the foreground layer. Second UIE 106 in second user interface 201b at the foreground layer is in proximity to first UIE 105 in first user interface 201a at the background layer. First UIE 105 is exposed through a transparent portion of second user interface 201b, which, without benefit of the present disclosure, would normally mean that first UIE 105 is viewable and selectable, such as due to an inaccurate selection of second UIE 106.

Figure 3C:
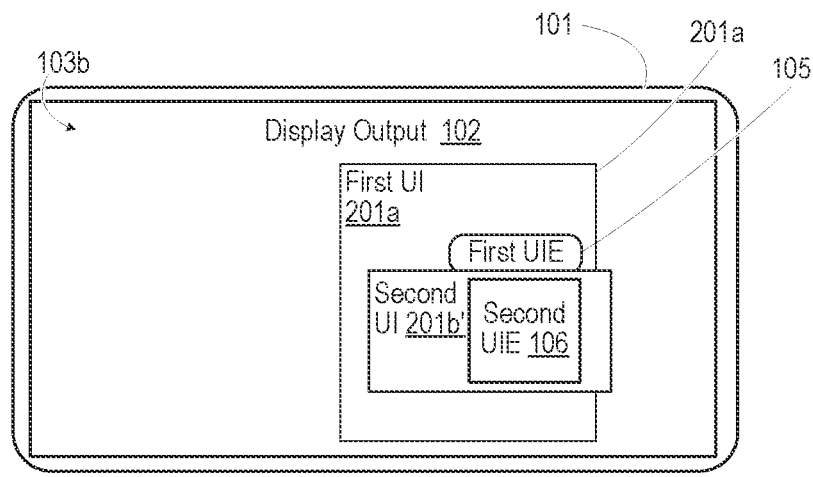
FIG. 3C is a front view of the communication device of FIG. 3A having the touch screen display presenting a second user interface on a second image layer that is layered on top of the first image layer of the display output, placing a second user interface element in the first image layer (i.e., foreground layer) with proximity and adjacent to a first user interface element that is exposed in the second image layer (i.e., a background layer), according to one or more embodiments.

FIG. 3C is a front view of communication device of FIG. 3A having touch screen display 103b presenting second user interface 201b' assigned as a second image layer that is layered on top of the first image layer, placing the first user interface 201a in a background layer and the second user interface 201b' in the foreground layer. Second user interface 201b' is an example of an opaque user interface that prevents seeing and selecting a background user interface element that is under second user interface 201b'. However, the dimensions of second user interface 201b' do not extend appreciably above second UIE 106, exposing first UIE 105 that is proximate to second UIE 106. The small size of second user interface 201b' allows this proximity to create the same situation as a transparent background of second user interface 201b (FIG. 3B).

Figure 3D:
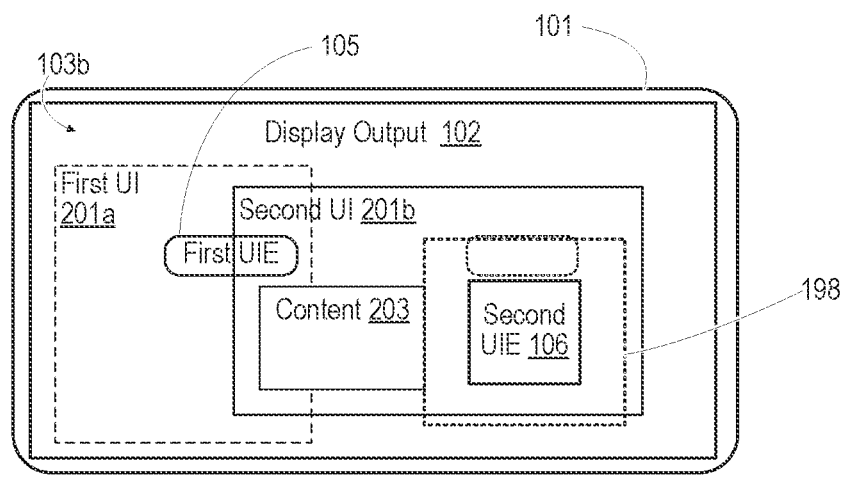
FIG. 3D is a front view of the communication device of FIG. 3B having the touch screen display presenting the layered user interfaces with a second rendering scheme that moves apart user interface elements in different layers by moving the second user interface element in the foreground layer outside of an area proscribed around the first user interface element in the background layer, according to one or more embodiments.

FIG. 3D is a front view of communication device 101 of FIG. 3B having touch screen display 103b presenting the layered user interfaces (201a and 201b) with a second rendering scheme that moves apart user interface elements (105 and 106) in different layers. In an example, the second rendering scheme is achieved by moving first UIE 105 of first user interface 201a in the background layer outside of area proscribed 198 around second UIE 106 of second user interface 201b in the foreground layer.

Figure 3E:
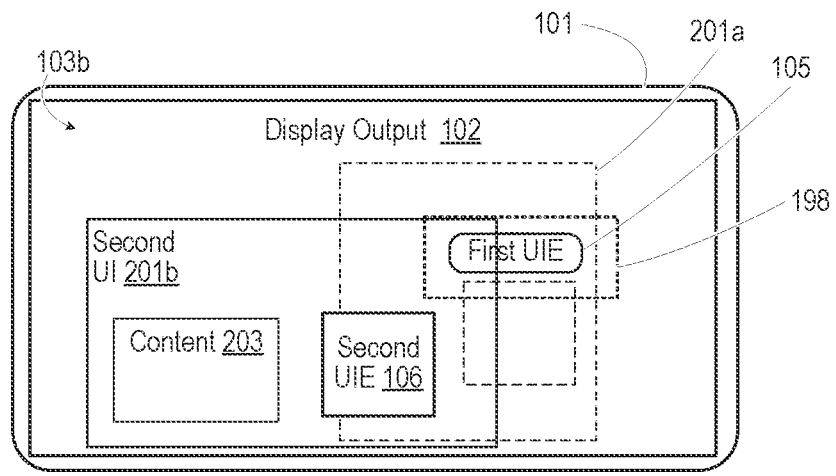
FIG. 3E is a front view of the communication device of FIG. 3B having the touch screen display presenting the layered user interfaces with a second rendering scheme that moves apart user interface elements in different layers by moving the first user interface element in the background layer outside of an area proscribed around the second user interface element in the foreground layer, according to one or more embodiments.

FIG. 3E is a front view of the communication device of FIG. 3B having touch screen display 103b presenting the layered user interfaces (201a and 201b) with the second rendering scheme that moves apart user interface elements (105 and 106) in different layers. In another example, the second rendering scheme is achieved by moving second UIE 106 of second user interface 201b in the foreground layer outside of area 198 proscribed around first UIE 105 of first user interface 201a in the background layer.

Figure 3F:
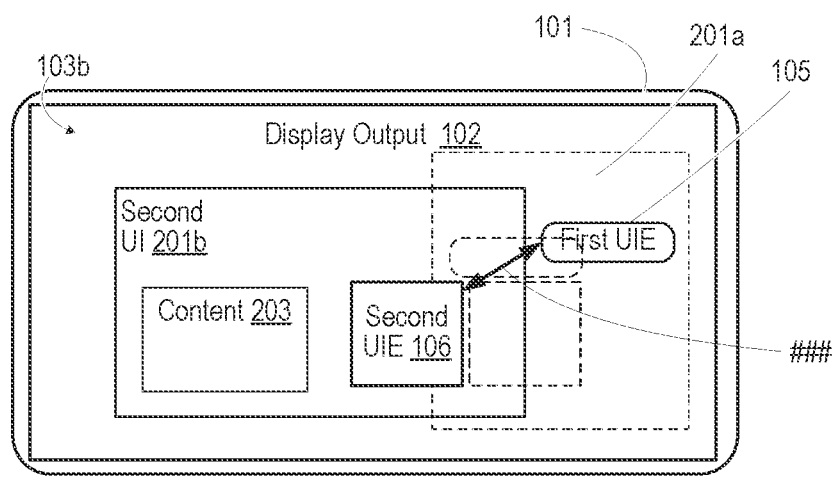
FIG. 3F is a front view of the communication device of FIG. 3B having the touch screen display presenting the layered user interfaces with a second rendering scheme that moves apart user interface elements in different layers by moving both the first user interface element in the background and the second user interface element in the foreground layer away from each other a proscribed distance, according to one or more embodiments.

FIG. 3F is a front view of the communication device of FIG. 3B having the touch screen display presenting the layered user interfaces (201a and 201b) with the second rendering scheme that moves apart user interface elements (105 and 106) in different layers. In an additional example, the second rendering scheme is achieved by moving both first UIE 105 of first user interface 201a in the background and second UIE 106 of second user interface 201b in the foreground layer away from each other by a proscribed distance.

Figure 3G:
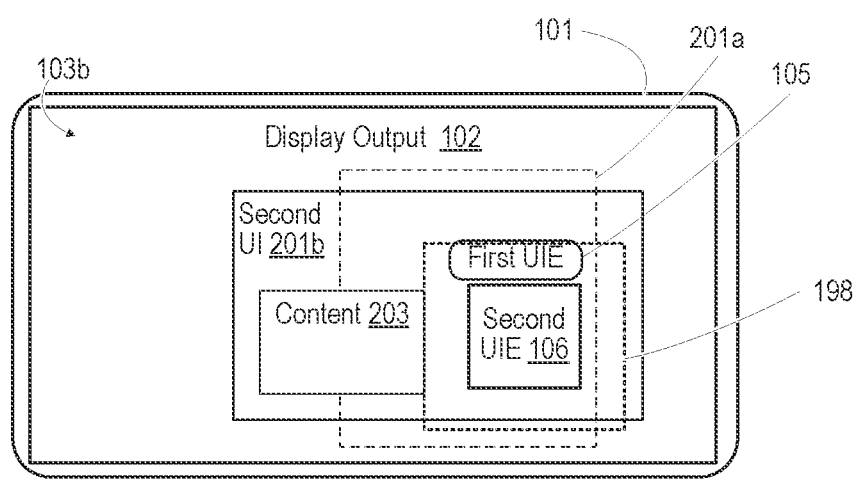
FIG. 3G is a front view of the communication device of FIG. 3B having the touch screen display presenting the layered user interfaces with the first rendering scheme that enables selection of a foreground user interface element while ignoring a background user interface elements that is proximate to the foreground user interface element, according to one or more embodiments.

FIG. 3G is a front view of communication device 101 of FIG. 3B having the touch screen display presenting the layered user interfaces (201a and 201b) with the first rendering scheme that ignores a background user interface element (105) that is proximate to a foreground user interface element (106) that is enabled for selection.

Figure 4:
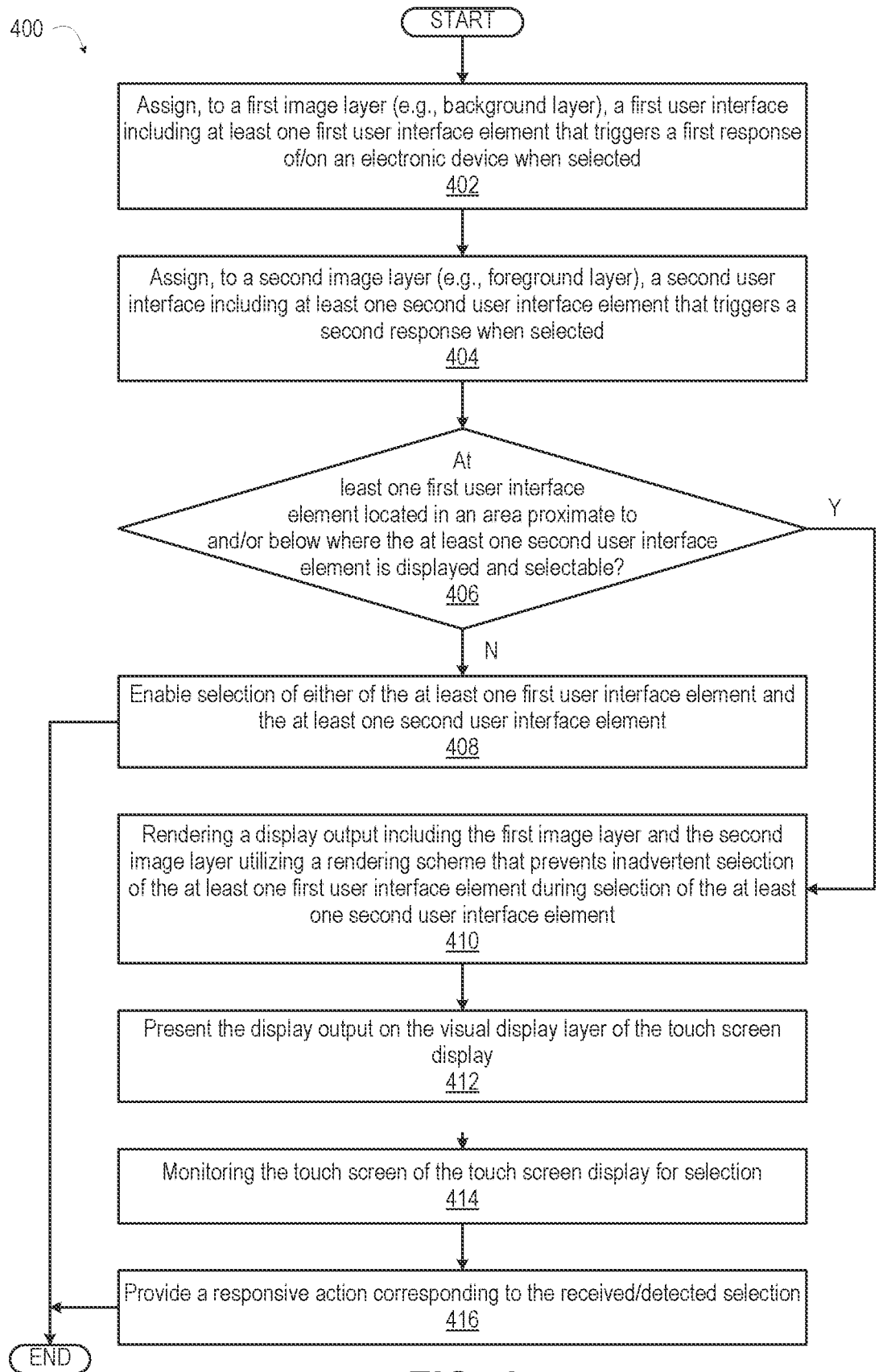
FIG. 4 is a flow diagram presenting a method of using a rendering scheme that prevents inadvertent touch activation of a first user interface element in a background layer of a display output that is proximate to a second user interface element in a foreground layer of the display output, according to one or more embodiments.
Figure 5:
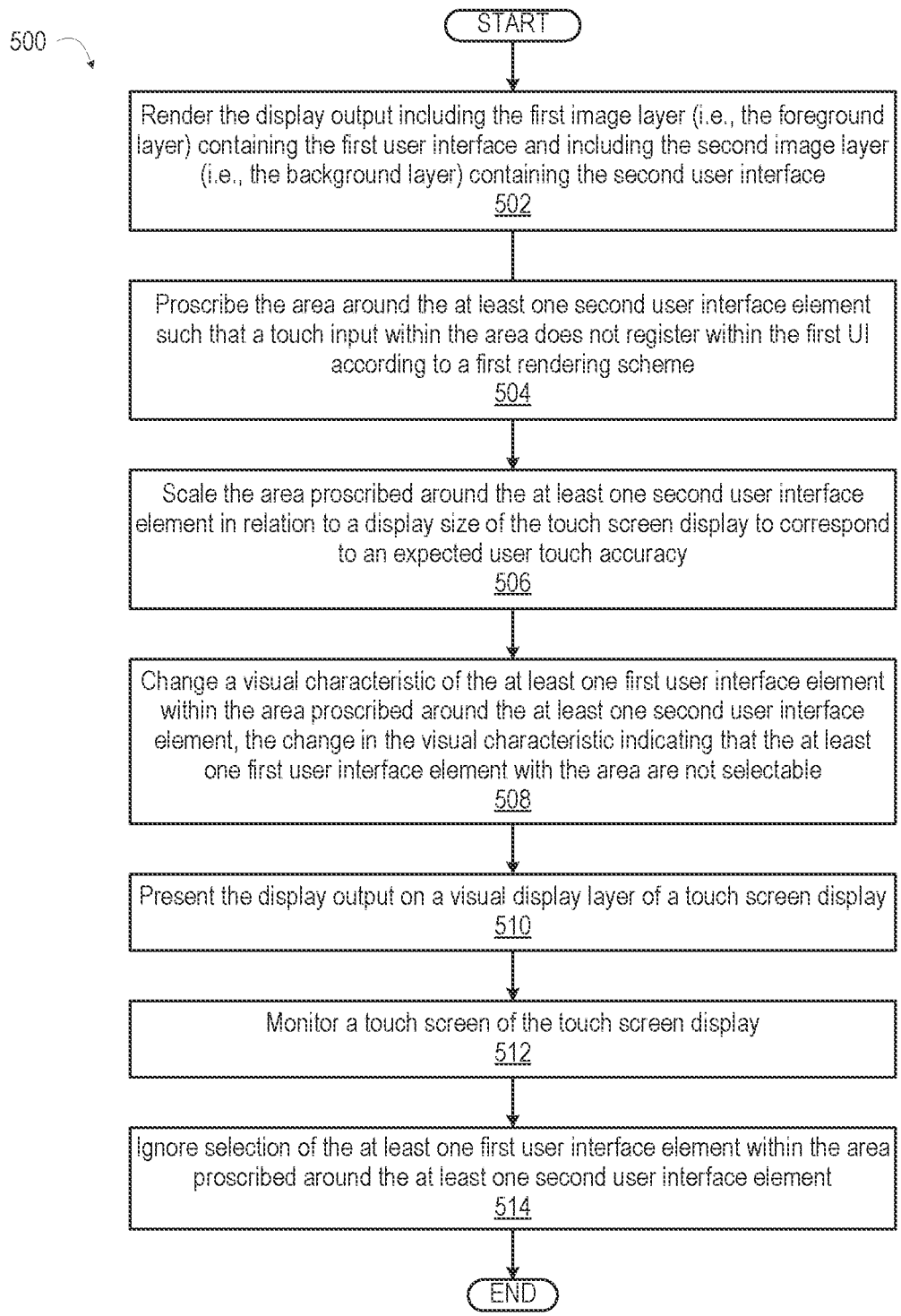
FIG. 5 is a flow diagram presenting a method of a first rendering scheme that enables selection of a foreground user interface element while ignoring background user interface elements within an area proscribed around the foreground user interface element to prevent inadvertent touch activation, according to one or more embodiments.
Figure 6:
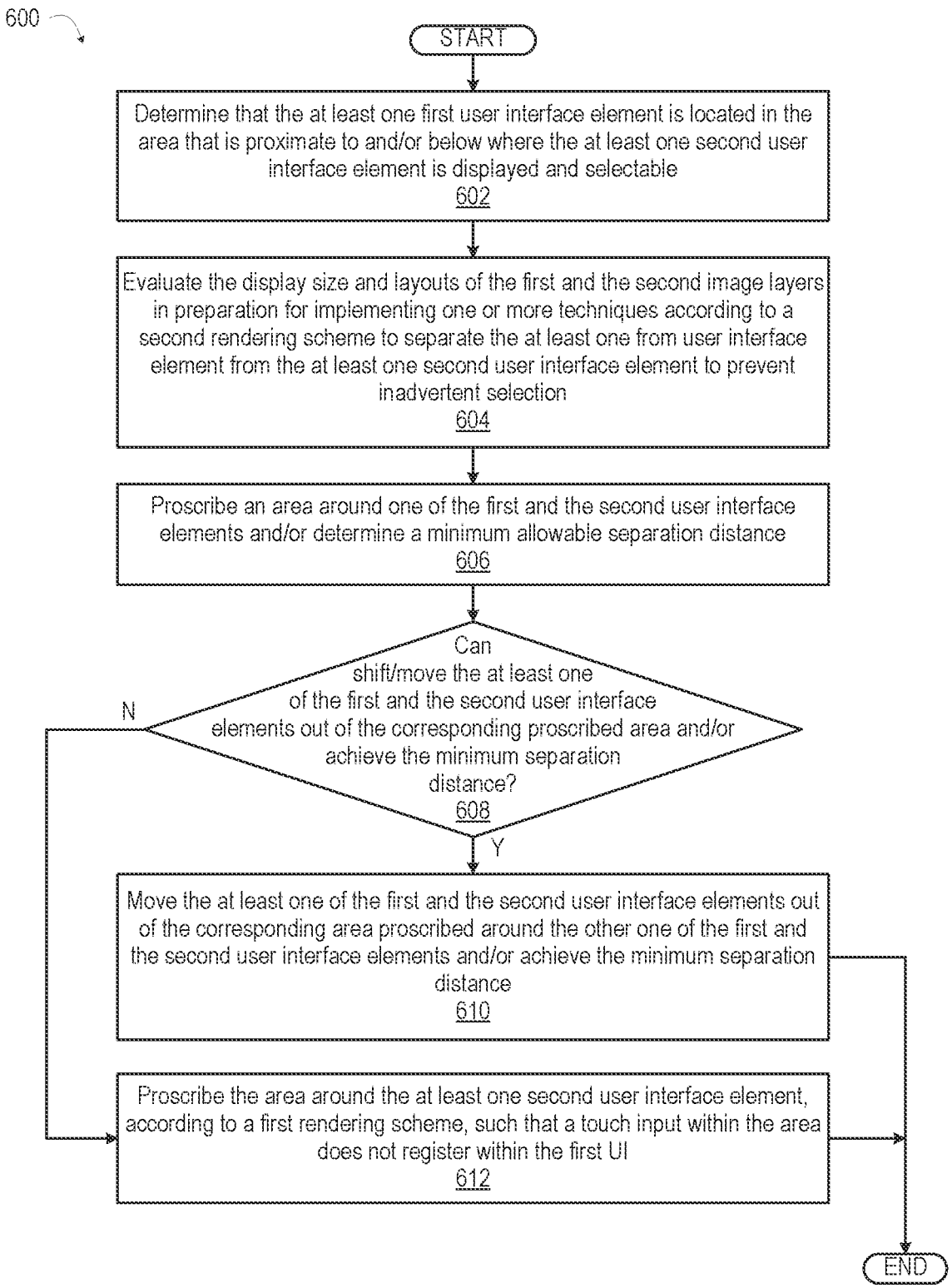
FIG. 6 is a flow diagram presenting a method of a second rendering scheme that spaces background user interface elements away from a foreground user interface element to prevent inadvertent touch activation, according to one or more embodiments.

FIG. 4 is a flow diagram presenting method 400 of using a rendering scheme that prevents inadvertent touch activation of a first user interface element in a background layer of a display output that is proximate to a second user interface element in a foreground layer of the display output. FIG. 5 is a flow diagram presenting method 500 of a first rendering scheme that ignores background user interface elements within an area proscribed around a foreground user interface element to prevent inadvertent touch activation. FIG. 6 is a flow diagram presenting method 600 of a second rendering scheme that spaces background user interface elements away from a foreground user interface element to prevent inadvertent touch activation. The descriptions of method 400 (FIG. 4), method 500 (FIG. 5), and method 600 (FIG. 6) are provided with general reference to the specific components illustrated within the preceding FIGS. 1, 2 and 3A-3G. Specific components referenced in method 400 (FIG. 4), method 500 (FIG. 5), and method 600 (FIG. 6) may be identical or similar to components of the same name used in describing preceding FIGS. 1, 2 and 3A-3G. In one or more embodiments, controller 110 (FIG. 1) configures communication device 101 (FIGS. 1, 2 and 3A-3G) to provide the described functionality of method 400 (FIG. 4), method 500 (FIG. 5), and method 600 (FIG. 6).

With reference to FIG. 4, method 400 includes assigning, to a first image layer (e.g., background layer), a first user interface comprising at least one first user interface element that triggers a first response of/on an electronic device when selected (block 402). In an example, the program code includes an application that generates the first user interface and an operating system function/feature that generates the second user interface, such as a pop-up notification with a user selectable element. In another example, the program code includes a first application that generates the first user interface and a second application that generates the second user interface, such as a pop-up advertisement with a user selectable element. In another example, the program code includes a first application that generates the first user interface and that also generates the second user interface, as a pop-up secondary feature with a user selectable element. Method 400 includes assigning, to a second image layer (e.g., foreground layer), a second user interface comprising at least one second user interface element that triggers a second response when selected (block 404). Method 400 includes determining whether the at least one first user interface element is located in an area proximate to and/or below where the at least one second user interface element is displayed and selectable (decision block 406). In response to determining that the at least one first user interface element is not located in the area that is proximate to and/or below where the at least one second user interface element is displayed and selectable, method 400 includes enabling selection of the at least one first user interface element and the at least one second user interface element (block 408). Then method 400 ends. In response to determining that the at least one first user interface element is displayed and selectable proximate to the location of the at least one second user interface element in decision block 406, method 400 includes rendering a display output including the first image layer and the second image layer utilizing a rendering scheme that prevents inadvertent selection of the at least one first user interface element during selection of the at least one second user interface element (block 410). Method 500 of FIG. 5 provides an example implementation of a first rendering scheme for block 410 (FIG. 4). Method 600 of FIG. 6 provides an example implementation of a first rendering scheme for block 410 (FIG. 4). Method 600 of FIG. 6 provides an example implementation of automatic selecting between the first and the second rendering schemes for block 410 (FIG. 4). With continued reference to FIG. 4, method 400 includes presenting the display output on the visual display layer of the touch screen display (block 412). Method 400 includes monitoring the touch screen of the touch screen display for selection (block 414) and providing a responsive action corresponding to the received/detected selection (block 416). Then method 400 ends.

With reference to FIG. 5, method 500 includes rendering the display output including the first image layer (i.e., the foreground layer) containing the first user interface and including the second image layer (i.e., the background layer) containing the second user interface (block 502). Method 500 includes proscribing the area around the at least one second user interface element, according to a first rendering scheme, such that a touch input within the area does not register within the first user interface (block 504). In one or more embodiments, method 500 includes scaling the area proscribed around the at least one second user interface element in relation to a display size of the touch screen display to correspond to an expected user touch accuracy (block 506). In one or more embodiments, method 500 includes changing a visual characteristic of the at least one first user interface element within the area proscribed around the at least one second user interface element, the change in the visual characteristic indicating that the at least one first user interface element within the area is not selectable (block 508). Method 500 includes presenting the display output on a visual display layer of a touch screen display (block 510). Method 500 includes monitoring a touch screen of the touch screen display (block 512). Method 400 includes ignoring selection of the at least one first user interface element within the area proscribed around the at least one second user interface element (block 514). Then method 500 ends.

With reference to FIG. 6, method 600 includes determining that the at least one first user interface element is located in the area that is proximate to and/or below where the at least one second user interface element is displayed and selectable (block 602). Method 600 includes evaluating the display size and layouts of the first and the second image layers in preparation for implementing one or more techniques according to a second rendering scheme to separate the at least one first user interface element from the at least one second user interface element to prevent inadvertent selection (block 604). In one or more embodiments, method 600 includes proscribing an area around one of the first and the second user interface elements or determining a minimum allowable separation distance (block 606). Method 600 includes determining whether at least one of the first and the second user interfaces can be shifted to move the at least one of the first and the second user interface elements out of the corresponding area proscribed around the other one of the first and the second user interface elements or to achieve the minimum separation distance (decision block 608). In response to determining that a shifting technique is available according to the second rendering scheme, method 600 includes moving the at least one of the first and the second user interface elements out of the corresponding area proscribed around the other one of the first and the second user interface elements to achieve the minimum separation distance (block 610). In an example, method 600 may include presenting both of the first and the second user interfaces in the display output without overlapping. In another example, method 600 may include shifting one of the first and the second user interfaces in the display output to increase spacing between the at least one first user interface element and the at least one second user interface element. In an additional example, method 600 may include shifting both of the first and the second user interfaces in the display output to increase spacing between the at least one first user interface element and the at least one second user interface element. In a further example, method 600 may include rearranging the at least one first user interface elements within the first user interface of the second image layer (i.e., the background layer) to increase spacing from the at least one second user interface element in the second user interface of the second image layer (i.e., foreground layer). In yet a further example, method 600 may include rearranging the at least one second user interface elements within the second user interface of the second image layer (i.e., the foreground layer) to increase spacing from the at least one first user interface element in the first user interface of the first image layer (i.e., background layer). Then method 600 ends. In response to determining that a shifting technique is not available according to the second rendering scheme, method 600 includes proscribing the area around the at least one second user interface element, according to a first rendering scheme, such that a touch input within the area does not register within the first UI (block 612). Then method 600 ends.

In one or more embodiments, rendering the display output includes arranging a display location of at least one of the first user interface and the second user interface to separate a relative location of the at least one first user interface element and the at least one second user interface element to be at least a predetermined distance that prevents the inadvertent selection. In one or more particular embodiments, method 600 further includes proscribing an area of the display output around the at least one second user interface element. Method 600 includes identifying an available area of the display output outside of the area proscribed around the at least one second user interface element. Method 600 includes moving the at least one first user interface element in the first image layer from within the area to the available area.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a display having a visual display layer;
a memory storing program code; and
a controller communicatively connected to the display and the memory, and which:
assigns, to a first image layer, a first user interface comprising at least one first user interface element that triggers a first response by the program code when selected;
assigns, to a second image layer, a second user interface comprising at least one second user interface element that triggers a second response by program code when selected;
determines whether the at least one first user interface element is assigned to be displayed and selectable below an area proscribed around the second user interface element and in proximity to the at least one second user interface element whereby inadvertent selection of the at least one first user interface element can occur when attempting to select the second user interface element;
renders a display output comprising the first image layer and the second image layer utilizing a rendering scheme that prevents the inadvertent selection of the at least one first user interface element within the first image layer during selection of the at least one second user interface element within the second image layer; and
presents the display output on the visual display layer of the display, wherein the inadvertent selection is prevented.

2. The electronic device of claim 1, wherein, in rendering the display output comprising the first and the second image layers, the controller:
assigns the first image layer as a background layer with the first user interface; and
assigns the second image layer with the second user interface as a foreground layer, on top of the background layer.

3. The electronic device of claim 1, wherein, in rendering the display output to prevent inadvertent selection of the at least one first user interface element, the controller:
proscribes an area around the at least one second user interface element;
enables selection of the at least one second user interface element within the area proscribed around the at least one second user interface element; and
ignores selection of the at least one first user interface element within the area proscribed around the at least one second user interface element.

4. The electronic device of claim 3, wherein the display is a touch screen display and the controller scales the area proscribed around the at least one second user interface element in relation to a display size of the display to correspond to an expected user touch accuracy.

5. The electronic device of claim 3, wherein, in rendering the display output, the controller changes an image characteristic of the at least one first user interface element within the area proscribed around the at least one second user interface element, the change in the image characteristic indicating that the at least one first user interface element with the area are not selectable.

6. The electronic device of claim 1, wherein, in rendering the display output, the controller arranges a display location of at least one of the first user interface and the second user interface to separate a relative location of the at least one first user interface element and the at least one second user interface element to be at least a distance that prevents the inadvertent selection.

7. The electronic device of claim 6, wherein the controller:
proscribes an area of the display output around the at least one second user interface element;
identifies an available area of the display output outside of the area proscribed around the at least one second user interface element; and
moves the at least one first user interface element in the first image layer from within the area to the available area.

8. The electronic device of claim 7, wherein the display is a touch screen display and wherein the controller scales the area proscribed around the at least one second user interface element in relation to a display size of the touch screen display to correspond to an expected user touch accuracy.

9. The electronic device of claim 1, wherein the program code comprises an application that generates the first user interface and an operating system that generates the second user interface.

10. A method comprising:
assigning, by a controller of an electronic device, to a first image layer, a first user interface comprising at least one first user interface element that triggers a first response by program code of the electronic device when selected, the controller communicatively connected to a display having a visual display layer and a memory storing the program code;
assigning, to a second image layer, a second user interface comprising at least one second user interface element that triggers a second response by the program code when selected;
determining whether the at least one first user interface element is assigned to be displayed and selectable below an area proscribed around the at least one second user interface element and in proximity to the at least one second user interface element whereby inadvertent selection of the at least one first user interface element can occur when attempting to select the at least one second user interface element;
rendering a display output comprising the first image layer and the second image layer utilizing a rendering scheme that prevents the inadvertent selection of the at least one first user interface element within the first image layer during selection of the at least one second user interface element within the second image layer; and
presenting the display output on the visual display layer of the display associated with the electronic device, wherein the inadvertent selection is prevented.

11. The method of claim 10, wherein rendering the display output comprises:
assigning the first image layer as a background layer with the first user interface; and
assigning the second image layer with the second user interface as a foreground layer, on top of the background layer.

12. The method of claim 10, wherein rendering the display output to prevent inadvertent selection of the at least one first user interface element comprises:
proscribing an area around the at least one second user interface element;
enabling selection of the at least one second user interface element within the area proscribed around the at least one second user interface element; and
ignoring selection of the at least one first user interface element within the area proscribed around the at least one second user interface element.

13. The method of claim 12, wherein the display is a touch screen display, the method further comprising scaling the area proscribed around the at least one second user interface element in relation to a display size of the display to correspond to an expected user touch accuracy.

14. The method of claim 12, wherein rendering the display output comprises changing an image characteristic of the at least one first user interface element within the area proscribed around the at least one second user interface element, the change in the image characteristic indicating that the at least one first user interface element with the area are not selectable.

15. The method of claim 10, wherein rendering the display output comprises arranging a display location of at least one of the first user interface and the second user interface to separate a relative location of the at least one first user interface element and the at least one second user interface element to be at least a distance that prevents the inadvertent selection.

16. The method of claim 15, further comprising:
proscribing an area of the display output around the at least one second user interface element;
identifying an available area of the display output outside of the area proscribed around the at least one second user interface element; and
moving the at least one first user interface element in the first image layer from within the area to the available area.

17. The method of claim 16, wherein the display is a touch screen display, the method further comprising scaling the area proscribed around the at least one second user interface element in relation to a display size of the touch screen display to correspond to an expected user touch accuracy.

18. The method of claim 10, wherein the program code comprises an application that generates the first user interface and an operating system that generates the second user interface.

19. A non-transitory computer program product comprising:
a computer readable storage device; and
program code on the computer readable storage device that when executed by a controller that is associated with an electronic device and is communicatively connected to a display of the electronic device having a visual display layer and a memory of the electronic device storing the program code, the program code enables the electronic device to provide functionality of:
assigning, to a first image layer of the display having the visual display layer, a first user interface comprising at least one first user interface element that triggers a first response by the program code of the electronic device when selected;
assigning, to a second image layer of the display, a second user interface comprising at least one second user interface element that triggers a second response by the program code when selected;
determining whether the at least one first user interface element is assigned to be displayed and selectable below an area proscribed around the at least one second user interface element and in proximity to the at least one second user interface element whereby inadvertent selection of the at least one first user interface element can occur when attempting to select the at least one second user interface element;
rendering a display output comprising the first image layer and the second image layer utilizing a rendering scheme that prevents the inadvertent selection of the at least one first user interface element within the first image layer during selection of the at least one second user interface element within the second image layer; and
presenting the display output on the visual display layer of the display associated with the electronic device, wherein the inadvertent selection is prevented.

20. The computer program product of claim 19, wherein the program code for rendering the display output comprises code that enables the electronic device to provide functionality of:

assigning the first image layer as a background layer with the first user interface; and assigning the second image layer with the second user interface as a foreground layer, on top of the background layer.

* * * * *